US011512954B2

(12) United States Patent
Loebig et al.

(10) Patent No.: US 11,512,954 B2
(45) Date of Patent: Nov. 29, 2022

(54) LASER LEVEL WITH ELECTRONIC TILT SENSOR

(71) Applicant: TECHTRONIC CORDLESS GP, Anderson, SC (US)

(72) Inventors: Jeffrey Carl Loebig, Hong Kong (CN); Man Kit Ho, Hong Kong (CN); Shuai Zhang, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 64 days.

(21) Appl. No.: 17/281,294

(22) PCT Filed: Oct. 10, 2018

(86) PCT No.: PCT/CN2018/109608
§ 371 (c)(1),
(2) Date: Mar. 30, 2021

(87) PCT Pub. No.: WO2020/073219
PCT Pub. Date: Apr. 16, 2020

(65) Prior Publication Data
US 2021/0404806 A1 Dec. 30, 2021

(51) Int. Cl.
*G01C 9/06* (2006.01)
*G01C 9/08* (2006.01)

(52) U.S. Cl.
CPC .............. *G01C 9/06* (2013.01); *G01C 9/08* (2013.01); *G01C 2009/066* (2013.01)

(58) Field of Classification Search
CPC .................. G01C 9/06; G01C 9/08
(Continued)

(56) References Cited

U.S. PATENT DOCUMENTS 5,313,713 A * 5/1994 Heger .................. G01C 9/06
 33/343
5,983,510 A 11/1999 Chyi-Yiing et al.
(Continued)

FOREIGN PATENT DOCUMENTS

CN 2509562 Y 9/2002
CN 101535764 A 9/2009
(Continued)

OTHER PUBLICATIONS

International Search Report with Written Opinion for related Application No. PCT/CN2018/109608 dated Jul. 1, 2019 (9 Pages).
(Continued)

*Primary Examiner* — George B Bennett
(74) *Attorney, Agent, or Firm* — Michael Best & Friedrich LLP

(57) ABSTRACT

A laser level containing a housing, an electronic tilt sensor located in the housing; a controller to which the electronic tilt sensor is connected, and a laser module. The controller is communicable with a first display device and a second display device. The laser line is adapted to project a straight ground laser line on a flat surface. The electronic tilt sensor is adapted to detect a tilt of the laser level and provide a measurement signal to the controller. The controller is adapted to provide a display signal to the first and second display devices to display information about the tilt. By using an electronic tilt sensor, the laser level can provide accurate indicate of the tilt of the device and also allows such tilt information to be processed further.

20 Claims, 8 Drawing Sheets

(58) Field of Classification Search
USPC .......................................... 33/366.11, 366.27
See application file for complete search history.

(56) References Cited

U.S. PATENT DOCUMENTS

| | | | |
|---|---|---|---|
| 6,037,874 A | | 3/2000 | Heironimus |
| 6,128,076 A | * | 10/2000 | Sackett .................... G01C 9/24 |
| | | | 356/249 |
| 7,228,635 B2 | | 6/2007 | Jian et al. |
| 7,363,716 B1 | * | 4/2008 | Tonkinson ............. A47G 1/205 |
| | | | 33/286 |
| 7,392,592 B2 | * | 7/2008 | Bublitz ................ G01C 15/002 |
| | | | 33/290 |
| 9,188,441 B2 | * | 11/2015 | Munroe .................. G01B 11/26 |
| 9,441,967 B2 | * | 9/2016 | Ranieri .................. G01C 15/06 |
| 2008/0154538 A1 | * | 6/2008 | Stathis ...................... G06T 7/33 |
| | | | 702/152 |
| 2019/0331488 A1 | * | 10/2019 | Corrigan ................ G01B 11/26 |
| 2020/0132838 A1 | * | 4/2020 | McGill ................ G01C 15/008 |
| 2021/0190948 A1 | * | 6/2021 | Zhang ................. G01C 15/004 |
| 2021/0302159 A1 | * | 9/2021 | Sakakibara ............... G01C 9/04 |
| 2022/0155066 A1 | * | 5/2022 | Selvaraj .................... G01C 3/08 |
| 2022/0170743 A1 | * | 6/2022 | Gould .................. G01C 15/004 |

FOREIGN PATENT DOCUMENTS

| | | |
|---|---|---|
| CN | 201476784 Y | 5/2010 |
| CN | 203719651 U | 7/2014 |
| CN | 204666140 U | 9/2015 |
| EP | 3093615 A1 | 11/2016 |
| WO | 2015096060 A1 | 7/2015 |

OTHER PUBLICATIONS

Canadian Patent Office Action for Application No. 3,115,557 dated Apr. 14, 2022 (5 pages).
Partial Supplementary European Search Report for Application No. 18936634.7 dated Apr. 13, 2022 (13 pages).
Extended European Search Report for Application No. 18936634.7 dated Jul. 14, 2022 (12 pages).

* cited by examiner

LASER LEVEL WITH ELECTRONIC TILT SENSOR

CROSS-REFERENCE TO RELATED APPLICATIONS

This application is a national phase filing under 35 U.S.C. § 371 of International Application No. PCT/CN2018/109608, filed Oct. 10, 2018, the entire content of which is incorporated herein by reference.

This invention relates to portable electronic instruments, and in particular to laser-based levels.

Laser line products are commonly used in construction job sites, and such a laser line product projects at least one straight laser line which is clearly visible so as to provide the user with a reference line. Conventionally, bubble vials are commonly used in laser levels which provide reference to the user visually, so that one can determine whether the laser level (and in turn the laser line emitted therefrom), when pointing upwardly, is deviated from the vertical axis which is perpendicular to the round.

However, the bubble vials create many problems when they are used in laser levels. For instance, the bubble in the vial is not easy to be inspected and whether it is leveled or not can only be judged by human eyes, which is inaccurate. In addition, during manufacturing of the laser level, one has to align the laser line with the bubble vial level through manual procedures. Such a process takes a long time and the accuracy of the product may shift due to manual assembling processes, gluing processes, etc. Thirdly, the function of the bubble vial is limited, as each bubble vial can only identify one levelness with respect to a vertical axis, not two or more levelness.

SUMMARY OF INVENTION

In the light of the foregoing background, it is an object of the present invention to provide an alternate laser level which eliminates or at least alleviates the above technical problems.

The above object is met by the combination of features of the main claim, the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a laser level containing a housing, an electronic tilt sensor located in the housing; a controller to which the electronic tilt sensor is connected, and a laser module. The controller is communicable with a first display device and a second display device. The laser line is adapted to project a straight ground laser line on a flat surface. The electronic tilt sensor is adapted to detect a tilt of the laser level and provide a measurement signal to the controller. The controller is adapted to provide a display signal to the first and second display devices to display information about the tilt.

Preferably, the first display device and the second display device are mounted on the housing and connected to the controller wirely.

More preferably, the first and second display devices are configured to display levelness of a tilt angle for the ground laser line with respect to a vertical axis, in two planes respectively.

Most preferably, the vertical axis is perpendicular to the earth. The two planes are perpendicular to each other, as well as being both perpendicular to the earth.

According to a variation of the preferred embodiments, the first and second display devices each further contains a plurality of lighting elements. The plurality of lighting elements are adapted to provide a varying light pattern to indicate information about the tilt angle.

Preferably, the plurality of lighting elements is aligned in a row and contains a middle lighting element and two side lighting elements.

More preferably, the middle lighting element is configured to be activated when the laser level is at substantially at a predetermined tilt angle. A side lighting element is configured to be activated when the laser level is deviated from the predetermined tilt angle.

In one particular implementation, the predetermined tilt angles are 0°, 180° or ±90° with respect to a vertical axis.

According to another variation of the preferred embodiments, the laser level further contains a user switch which is adapted to power on/off of the laser level, and a mode switch which is adapted to switch between a normal measuring mode and an angle-lock mode.

According to a further variation of the preferred embodiments, the first display device is adapted to indicate a low battery status of the laser level.

According to a further variation of the preferred embodiments, the laser level is adapted to work in an angle-lock mode in which the controller saves the tilt information into a memory which is connected to the controller.

Preferably, when the laser level is substantially at a saved tilt angle, only the middle lighting element is configured to be turned on. When the laser level is deviated from the saved tilt angle, only a side lighting element is configured to be turned on.

According to a further variation of the preferred embodiments, the laser level further contains a wireless module connected to the controller. The first and second display devices are implemented on a screen of a portable computing device.

Preferably, the wireless module is adapted to transfer the information of the tilt to the portable computing device wirelessly connected with the laser level.

Accordingly to a second aspect of the invention, there is disclosed a method of calibrating a laser level, which contains the steps of placing a laser module of the laser level on a fixture of which a levelness is known, attaching an electronic tilt sensor module to the laser module, using the electronic tilt sensor module to measure an angle difference between the levelness and a tilt of the electronic tilt sensor module, computing a compensation value for the laser module for the angle difference; and storing the compensation value into a memory of the electronic tilt sensor module.

Accordingly to a third aspect of the invention, there is disclosed a method of extending a line measurement by a laser level, which contains the steps of placing the laser level in front of a workpiece having a surface, pointing the laser level at a predetermined angle where the laser level emits a laser line along the predetermined angle, marking a physical line on the surface which substantially follows the laser line, saving the predetermined angle into a memory of laser level, moving the laser level to an end of the physical line; and adjusting the laser level to be at the predetermined angle, so that the line measurement is extended.

Preferably, the predetermined angle is inputted to the laser level through a portable device external to the laser level.

Accordingly to a fourth aspect of the invention, there is disclosed a method of making a parallel line measurement by a laser level, which contains the steps of placing the laser level in front of a workpiece having a surface, pointing the laser level at a predetermined angle where the laser level emits a laser line along the predetermined angle; marking a physical line on the surface which substantially follows the laser line; saving the predetermined angle into a memory of laser level; moving the laser level in an offset direction from the physical line; and adjusting the laser level to be at the predetermined angle, so that the laser line becomes parallel to the physical line.

Preferably, the predetermined angle is inputted to the laser level through a portable device external to the laser level.

Accordingly to a fifth aspect of the invention, there is disclosed a method of measure the height of a target, which contains the steps of measuring the horizontal distance between the target and a reference point, using a laser level to measure a first angle through the reference point to the lower corner at which the target intersects with a ground, transmitting a value of the first angle by the laser level to an external device, saving the value of the first angle in the external device and the laser level, using the laser level measure a second angle though the reference point to the upper corner at which the target intersects with a ceiling, transmitting a value of the second angle by the laser level to the external device, saving the value of the second angle in the external device and the laser level; and calculating the height of target using the following equation:

Height of target=(tan(first angle)+tan(second angle))
*distance from the reference point to the target.

There are many advantages to the present invention. First of all, it is apparent that by replacing bubble vials in traditional laser level with electronic tilt sensors, such as accumulators, gravity sensors or gyrometers, the measurement of the tilt of the laser level becomes much more accurate. The user does not need to rely on their manual inspection of a relative position of the bubble in the tube of a bubble vial, but rather the electronics will do the job. As a result, even if the user's eyes are far away from the laser level, he/she can still easily spot the illumination of the LEDs which indicates the levelness or the amount of any tilt. It also makes it easier to calibrate the laser level in factory so that when the end-user receives the laser level, it is in a read-to-use status with calibrated measurement to ensure a precise reading. The elimination of a bubble vial also increases the durability during accidental fall-over condition, since the electronic components are less vulnerable as compared to a bubble vial.

The tilt information being digitized also enables it to be stored and reused, which greatly expands the application of the laser level. Just as in two examples described in embodiments of the present invention, the stored angle in the laser level can be used as a basis for second or subsequent measurements, so that an extended laser line can be based on a first marked physical line, or a parallel line can be based on the first marked physical line. There are many other possibilities of using the laser level to conduct complex measurement and alignment in indoor environments, which adds to the flexibility of the use of the laser level. For example, the measured tilt condition of the laser level can be transmitted wirelessly to an external computing device to process the data further.

BRIEF DESCRIPTION OF FIGURES

The foregoing and further features of the present invention will be apparent from the following description of preferred embodiments which are provided by way of example only in connection with the accompanying figures, of which.

In the drawings, like numerals indicate like parts throughout the several embodiments described herein.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Terms such as "horizontal", "vertical", "upwards", "downwards", "above", "below" and similar terms as used herein are for the purpose of describing the invention in its normal in-use orientation and are not intended to limit the invention to any particular orientation.

Figure 1:
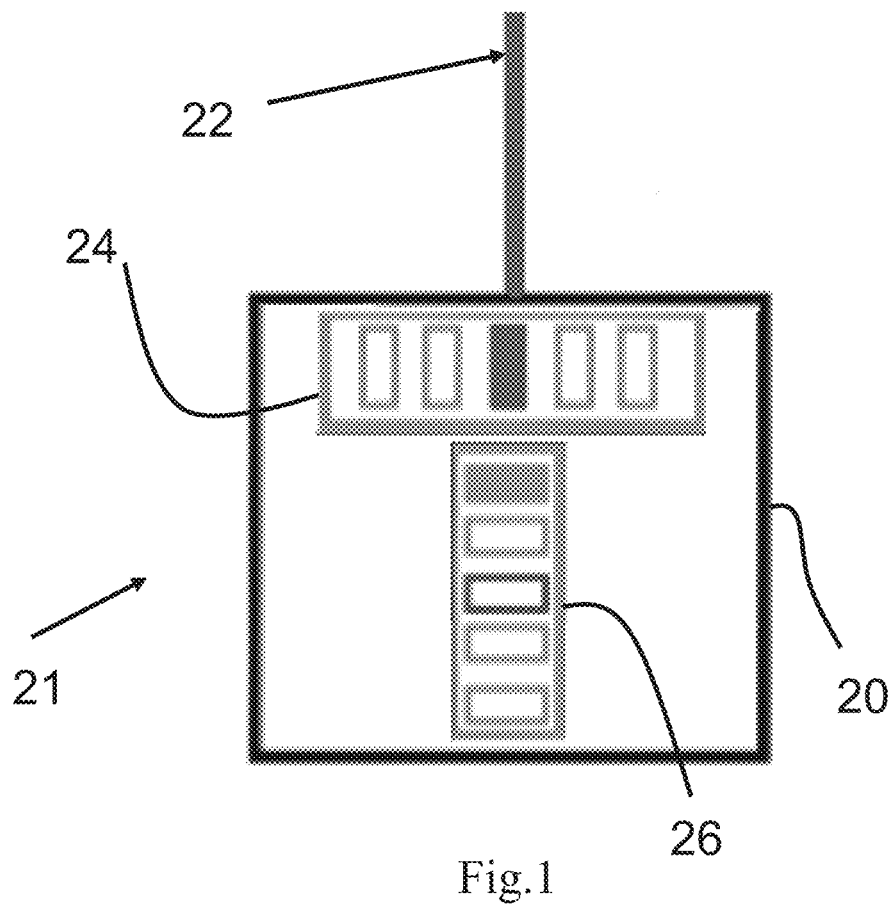
FIG. 1 shows the appearance of a laser level according to a first embodiment of the present invention.

Referring now to FIG. 1, the first embodiment of the present invention is a laser level 21 which is suitable for a user to hold with his/her hand and which requires no wire connection to other devices. The laser level 21 contains a housing 20, and first and second indication (for example LED or LCD) modules 24, 26 configured on the housing 20. Inside the housing 20 there are various components such as a battery, an electronic tilt sensor, a controller, a memory, and a laser module, all of which are not shown in FIG. 1. Nonetheless, FIG. 1 shows a laser line 22 as emitted by the laser module in the laser level 21. The laser level 21 also contains a power switch (not shown) for controlling the power on/off of the laser level 21, as well as a mode switch (not shown) for changing the working mode of the laser level 21. Each of the first and second indication modules 24, 26 contains five LEDs placed in a row, as will be described in more details later.

Figure 2:
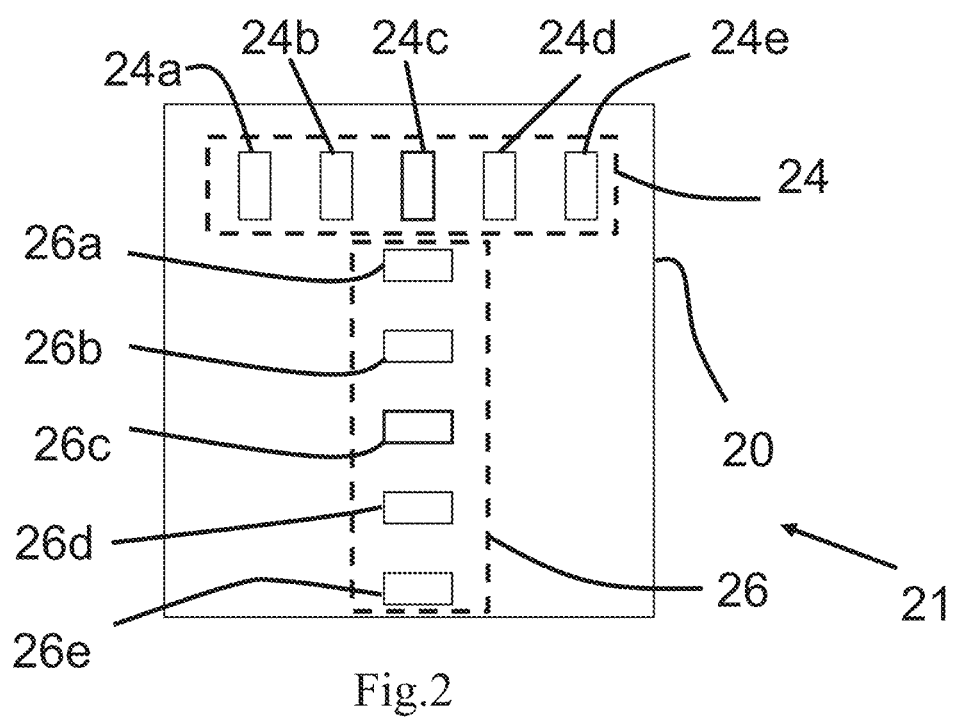
FIG. 2 shows separately the two indication modules of the laser level in FIG. 1.

Turning now to FIG. 2, the first indication module 24 contains five LEDs 24a, 24b, 24c, 24d and 24e as lighting elements, which are aligned in a row. Among them, LED 24c is located in the middle of the row and is also referred to as a middle LED or a middle lighting element. The other LEDs 24a, 24b, 24d and 24e are located evenly on two sides of the LED 24c and LEDs 24a, 24b, 24d and 24e are also referred to as side lighting elements. Similarly, the second indication module 26 contains five LEDs 26a, 26b, 26c, 26d and 26e as lighting elements, which are aligned in a row. Among them, LED 26c is located in the middle of the row and is also referred to as a middle lighting element. The other LEDs 26a, 26b, 26d and 26e are located evenly on two sides of the LED 26c and LEDs 26a, 26b, 26d and 26e are also referred to as side lighting elements. Note that the first indication module 24 and the second indication module 26 are oriented to be perpendicular to each other on a same side of the housing 20 of the laser level 21. The LEDs in each of the first indication module 24 and the second indication module 26 can be either mono-color LEDs (i.e. each LED displays only one color of light) or multi-color LEDs (i.e. each LED displays more than one color of light). However, it is preferable that the five LEDs in each of the first indication module 24 and the second indication module 26 are of the same type.

Figure 3:
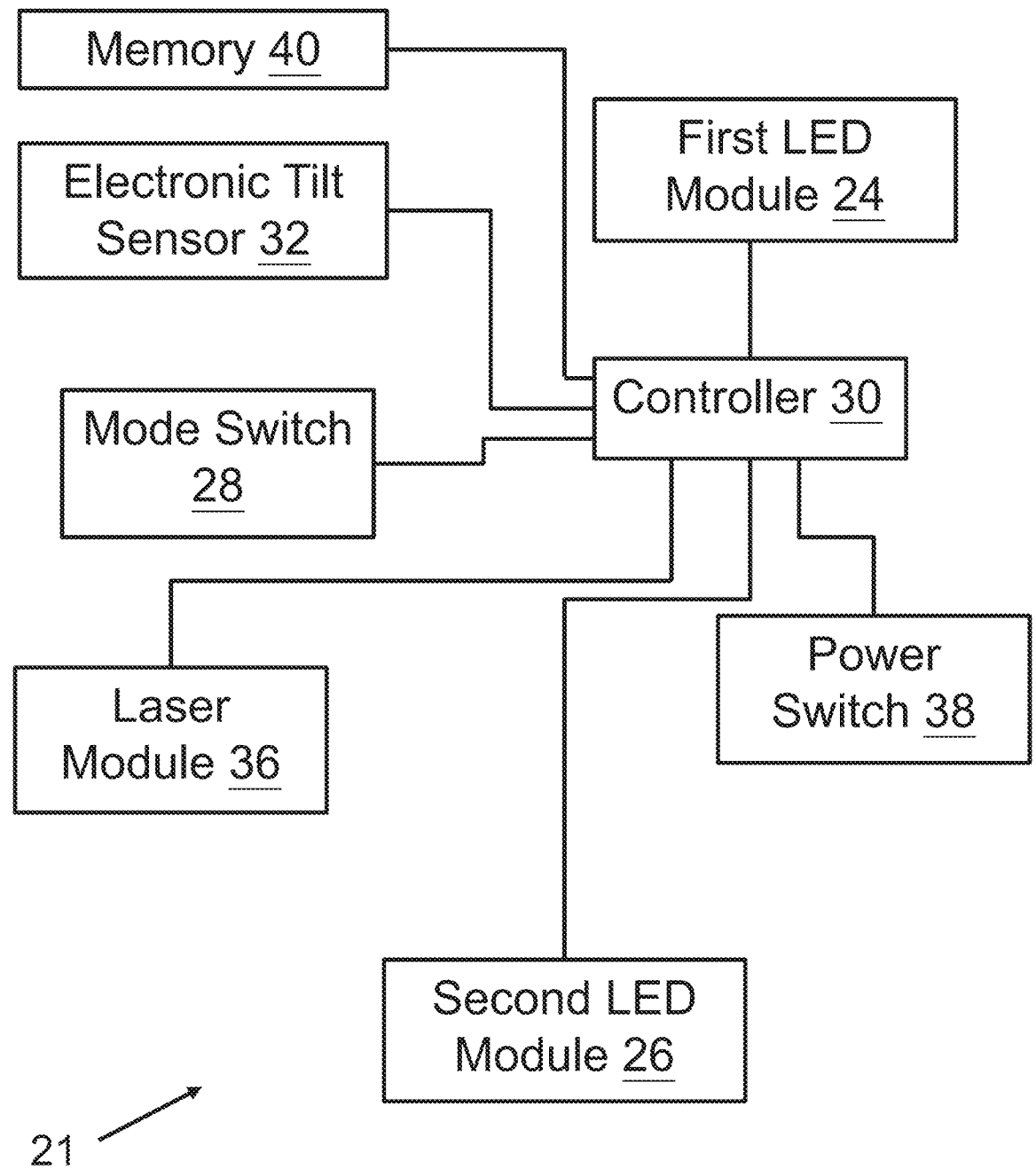
FIG. 3 is the internal schematic diagram of components of the laser level in FIG. 1.

Referring now to FIG. 3, the internal block diagram of the laser level 21 in FIG. 1 is shown. The laser level 21 contains a controller 30 as the central processing unit of the laser level 21. The controller 30 is connected to various components including the first indication module 24, the second indication module 26, an electronic tilt sensor 32, the laser module 36, a mode switch 28 and a power switch 38. In particular, the first indication module 24 and the second indication module 26 are connected wirely to the controller 30. The electronic tilt sensor 32 can be an accumulator, a gravity sensor or a gyrometer. The electronic tilt sensor 32 is configured to measure a tilt of the laser level 21 (as the electronic tilt sensor 32 is fixed to the housing of the laser level, and to transmit measurement signals representing the tilt to the controller 30. It should be noted that in this embodiment although single electronic tilt sensor 32 is configured to measure the tilt condition of the laser level, two separate display modules which are the first and second indication modules 24, 26 are used to present the tilt angles in different planes. The first and second indication modules 24, 26 are connected to the controller 30 and they are adapted to be driven by the controller 30 to display information about tilt angles measured by the electronic tilt sensor 32, based on display signals sent from the controller 30. The laser module 36 as mentioned is adapted to project a straight laser line on a surface for the user to inspect and use as a reference for measurement/marking. The laser module 36 for example is able to output a ground laser line which uses a lens to spread the laser in a waterfall manner. Alternatively, the laser module 36 is able to output a line laser which has a fan shape and which is able to project a straight laser line on the wall. The controller 30 is further connected to a memory 40 which is adapted to temporarily or permanently store data of the tilt angle for the laser level 21. All the components described above are connected to the internal battery (not shown) of the laser level 21 in order for these components to properly function.

Now turning to the operation of the device described above. The laser level 21 described and illustrated in FIGS. 1-3 is capable of detecting a tilt of the laser level 21 and presents such tilt condition to the user in two different planes at the same time. In use, the user powers on the laser level 21 by pressing once the power switch 38 in FIG. 2. The laser level 21 then enters a normal working mode, and the electronic tilt sensor 32 immediately starts to measure any tilt of the laser level 21, and send measurement signals representing such tilt to the controller 30. The controller 30 then converts the received measurement signals to display signals suitable for driving the first and second indication modules 24, 26 respectively. The conversion may take into consideration of any compensation value stored in the memory 40 of the laser level 21. Then, the first and second indication modules 24, 26 would display, each by their five LEDs, a real-time tilt condition with regards to the tilt angles in the respective planes respectively. In the normal working mode, the angle of 0° can be considered as a predetermined angle since the angle of 0° indicates a levelness of the laser level 21.

It should be noted that although the electronic tilt sensor 32 is able to measure an accurate value of the tilt angle, with the laser level in FIGS. 1-3 it is not possible to display the actual tilt angle value. Rather, the five LEDs in each one of the first and second indication modules 24, 26 will be selectively turned on, according to the different ranges in which the titling angle value falls into. Table 1 below shows such angles ranges according to the time of display by each of the LEDs in a row in the first indication module 24 or the second indication module 26. There is no overlap in the angle ranges so in this normal mode there will be no two of LEDs in a row to be turned on at the same time. For example, when the middle LED is turned on, it means that the respective levelness as indicated by the first indication module 24 or the second indication module 26 is substantially achieved. When the leftmost LED is on, it means that the laser level is at an angle difference of +0.75° to +1° as compared to levelness. For the convenience of description, the five LEDs are designated by #1 to #5 in Table 1 respectively, which correspond respectively to five LEDs 24a, 24b, 24c, 24d and 24e in the first indication module 24, or respectively to five LEDs 26a, 26b, 26c, 26d and 26e in the second indication module 26.

TABLE 1

| LED | #1 | #2 | #3 | #4 | #5 |
|---|---|---|---|---|---|
| Angle (degree) | +0.76° C. to +1° C. | +0.26° C. to +0.75° C. | +/− 0.25° C. | −0.26° C. to −0.75° C. | −0.76° C. to −1° C. |

The above-mentioned power switch 38 has another function that by pressing the power switch 38 within 0.5 seconds, and once, it makes the laser level 21 to power off. On the other hand, the mode switch 28 is used to make the laser level 21 entering an angle-lock mode which is different from the normal working mode. The angle lock mode is entered by pressing down the mode switch 28 while the laser level 21 is in the normal working mode.

In addition to displays under the above normal working mode and angle lock mode, the first indication module 24 or the second indication module 26 may also automatically enters a low battery status mode. Table 2 below shows how the LEDs will behave when the battery voltage of the battery in the laser level is at different levels. For example, if the battery voltage is detected to be smaller than 1.9V, then this indicates a "no battery" status, and the LEDs (all LEDs of the first indication module 24 or the second indication module 26) will blink 3 times and then the laser level will switch off.

TABLE 2

| Voltage level | Level defined | After Power on: | Operation |
|---|---|---|---|
| 2.2V < V battery | Battery full | Normal operation | Normal operation |
| 1.8V < V battery <2.3 V | Low battery | LED blink 3 times; then entering Normal operation | Normal operation |
| V battery < 1.9 V | No battery | LED blink 3 times then Switch off | Switch off |

Figure 4A:
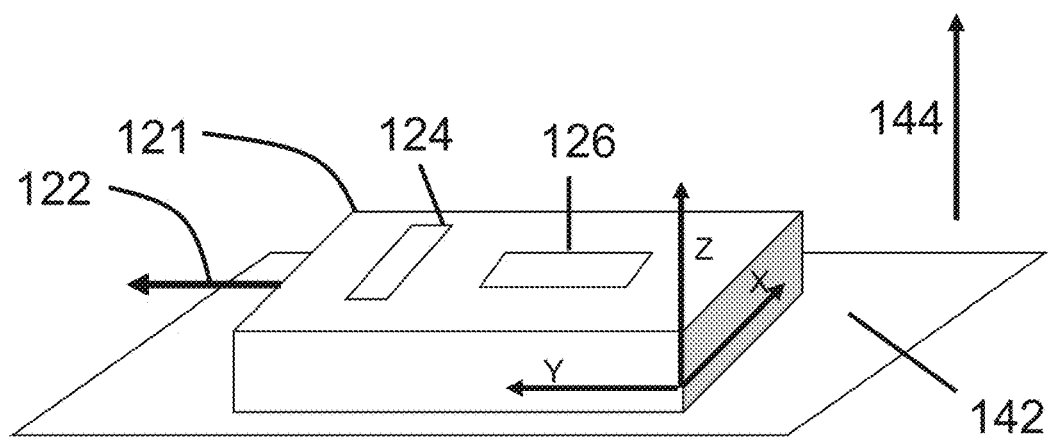
FIG. 4a illustrates a laser level placed on a table according to another embodiment of the present invention.
Figure 4B:
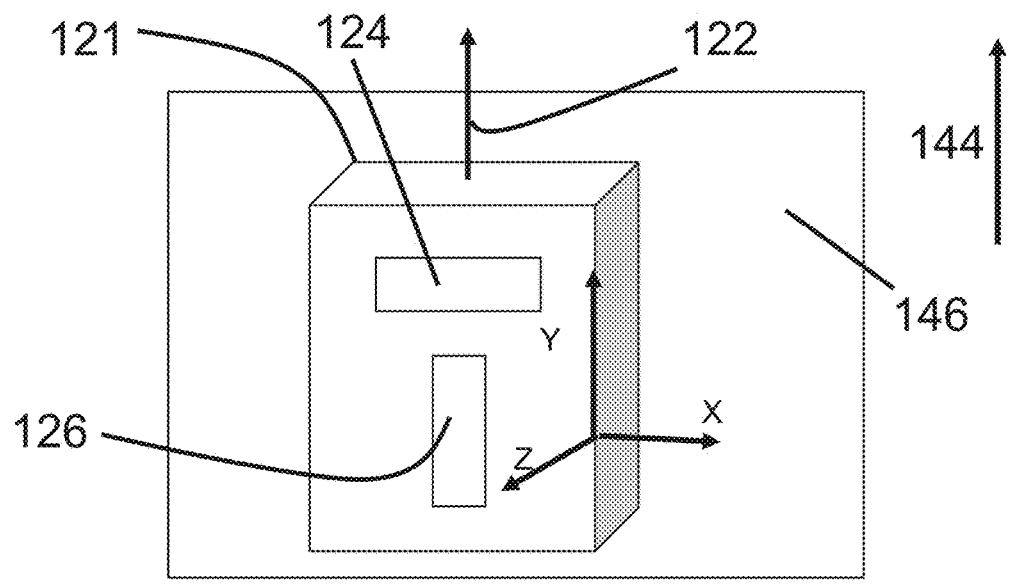
FIG. 4b illustrates the laser level of FIG. 4a which is now pressed against a wall and the laser beam pointing upwardly.
Figure 4C:
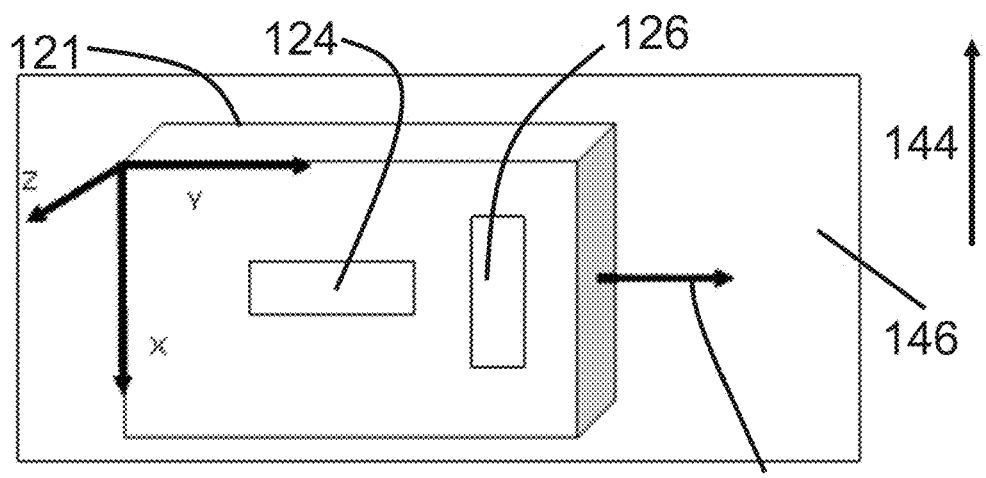
FIG. 4c illustrates the laser level of FIG. 4a which is now pressed against a wall and the laser beam pointing horizontally.

FIGS. 4a-4c show a laser level 121 which is slightly different from the laser level shown in FIGS. 1-3 in appearance of the device, but their functions are substantially the same. The laser level 121 is capable of detecting a tilt condition of the laser level 121 with regards to a vertical axis. The vertical axis is defined as an axis which is parallel to the direction of gravity and which is perpendicular to the earth. As mentioned above, the laser level 21 uses two indication modules 124, 126 to display the tilt angles in two different planes. The two planes are perpendicular to each other, but are both perpendicular in the earth.

FIG. 4a shows a scenario where the laser level 121 is laid down on a table which has a surface 142. The table surface 142 is parallel to the earth, but a vertical axis 144 is perpendicular to the table surface 142. In this case, the middle LED (not shown) which is the middle lighting element of both of the two indication modules 124, 126 should be activated and illuminating a light. In the three-dimensional coordinate system XYZ defined by the laser level 121, the activation of the middle LED in a first indication module 124 means that there is no tilt of the laser level 121 in the XZ plane with respect to the vertical axis 144 as shown in FIG. 4a, so the tilt angle in the XZ plane now equals to zero. In addition, the activation of the middle LED in a second indication module 126 means that there is no tilt of the laser level 121 in the YZ plane with respect to the vertical axis 144 as shown in FIG. 4a, so the tilt angle in the YZ plane now equals to zero. Lastly, there is no indication of any rotation or orientation of the laser level 121 in the XY plane, which is the horizontal plane in FIG. 4a. In FIG. 4a, the laser level is able to indicate the tilt in two planes XZ and YZ, where both XZ and YZ planes are perpendicular to the earth and being perpendicular to each other.

It should be noted that in FIG. 4a, both the first and second indication modules 124, 126 indicating a zero tilt angle is due to the fact that the table surface 142 is horizontal and parallel to the earth. If the table surface 142 is not perfectly horizontal, but somehow inclined from the horizontal plane, then such inclination will be detected and shown by one or both of the first and second indication modules 124, 126. For the laser level 121 it is not possible to display the actual tilt angle value. Rather, the five LEDs in the first indication module 124 or the second indication module 126 will be selectively turned on, according to the different ranges in which the titling angle value falls into, similar to those mentioned above with respect to Table 1.

In FIG. 4b, the laser level 121 is aligned to a wall surface 146, for example by pressing the laser level 121 against the wall surface 146 to ensure that a back side of the laser level 121 abuts the wall surface 146. In this case, the first indication module 124 functions to indicate a tilt in the XY plane. When there is substantially not tilt of the laser level 121 with respect to the vertical axis 144 in the XY plane, then a middle LED (not shown) which is the middle lighting element of the first indication module 124 should be activated and illuminating a light, indicating that the laser level 121 achieves a substantial levelness. However, when there is in fact a tilt of the laser level 121 in the XY plane in FIG. 4b, then instead of the middle LED, one of the four side LEDs (not shown) will be activated to indicate the degree of tile according to Table 1 above. However, in the case of FIG. 4b, the second indication module 126 will always indicate a levelness (i.e. zero-degree tilt angle) by having its middle LED turned on, since the laser level 121 abuts the wall surface 146 so presumably there is no tilt in the YZ plane. In the case of FIG. 4b, the laser beam 122 emitted by the laser level 121 points upwardly substantially if the middle LED of the first indication module 124 is activated.

In FIG. 4c, the laser level 121 is again aligned to the wall surface 146, but its orientation is different from that in FIG. 4b. In particular, the laser beam 122 emitted by the laser level 121 now points substantially to a horizontal direction. The laser level 121 is again pressed against the wall surface 146 to ensure that the back side of the laser level 121 abuts the wall surface 146. In the case shown in FIG. 4c, the second indication module 126 functions to indicate a tilt in the XY plane, not the first indication module 124 as in FIG. 4b. When there is substantially not tilt of the laser level 121 with respect to the vertical axis 144 in the XY plane, then a middle LED (not shown) which is the middle lighting element of the second indication module 126 should be activated and illuminating a light, indicating that the laser level 121 achieves a substantial levelness. However, when there is in fact a tilt of the laser level 121 in the XY plane in FIG. 4c, then instead of the middle LED of the second indication module 126, one of the four side LEDs (not shown) will be activated to indicate the degree of tile according to Table 1 above. However, in the case of FIG. 4c, the first indication module 124 will always indicate a levelness by having its middle LED turned on, since the laser level 121 abuts the wall surface 146 so presumably there is no tilt in the XZ plane.

Figure 5:
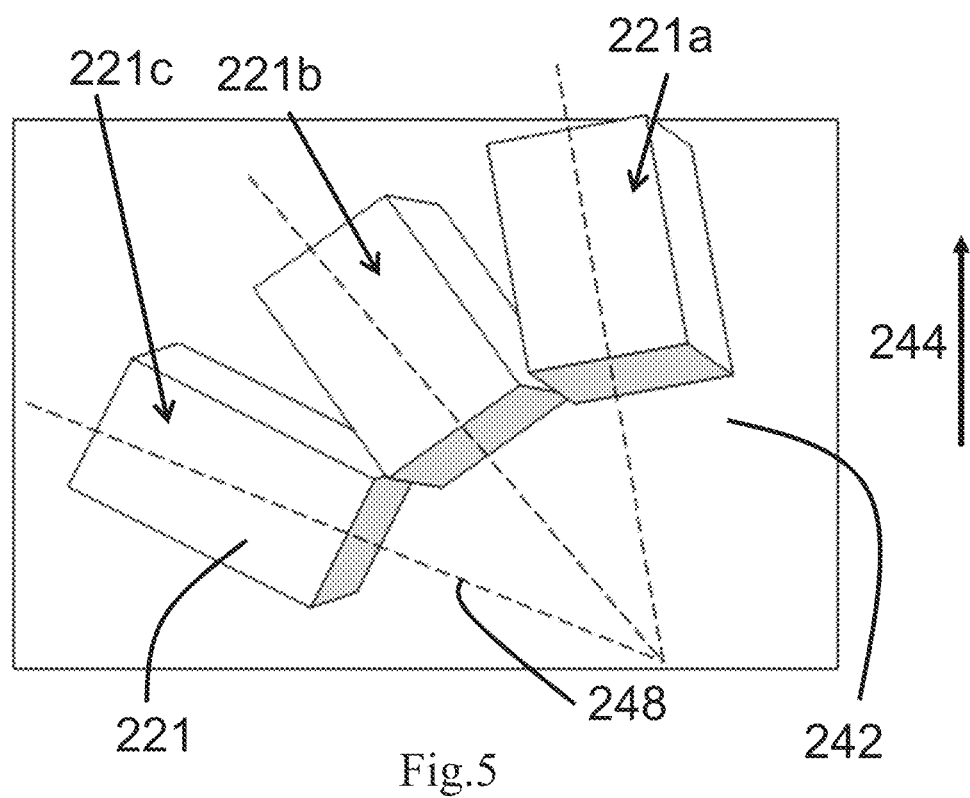
FIG. 5 illustrates different orientations of a laser level in an angle lock mode according to another embodiment of the present invention.

Turning now to FIG. 5, which illustrated how a laser level 221 can be used to conduct an angle-lock operation. The laser level 221 has functions similar as the laser level described with reference to FIGS. 1-3, and for example the laser level 221 can enter the angle-lock mode by pressing a mode switch as described above. Immediately upon entering into the angle lock mode, the previous tilt data detected by the electronic tilt sensor is saved in the memory (both not shown in FIG. 5) of the laser level 221. In the angle-lock mode, the second indication module (not shown) which has a row of LEDs aligned along a direction parallel to the laser beam 248 is always on (with its all five LEDs 26a-26e activated) to indicate to the user of the angle-lock mode. On the other hand, the five LEDs of the first indication module (not shown) which has a row of LEDs aligned along a direction parallel to the laser beam 248 be turned on according to different tilt angle measured by the electronic tilt sensor, as will be described in more details later. However, the angle lock mode can only be entered when the laser level 221 is aligned against a vertical wall surface, as shown in FIG. 5 as well in FIGS. 4b and 4c. In other words, the laser level 221 is not allowed to enter angle-lock mode when the tilt detected by the electronic tilt sensor 32 is less than +/−5*in any plane (such as the case shown in FIG. 4a), in which case the laser level 221 automatically goes back to the normal working mode.

FIG. 5 shows an example in which different orientations of the laser level 221 leads to different indication produced by the laser level 221 in the angle-lock mode. Among them, assume Position 221b is the position in which the laser level 221 is at a desired angle in the plane parallel to the wall surface 242. When the detected tilt angle is less than the predetermined angle (that is, the saved angle value in the memory of the laser level 221), which is indicated by Position 221a, the five LEDs in each one of the first indication modules 24, 26 will be selectively turned on, according to the different ranges in which the titling angle value the predetermined angle falls into. Table 3 below shows such angles ranges according to the time of display by each of the LEDs in a row in the first indication module 24. There is no overlap in the angle ranges so in this normal mode there will be no two of LEDs in a row to be turned on at the same time. For example, when the middle LED is turned on, it means that the respective levelness as indicated by the first indication module 24 is substantially achieved. When the leftmost LED is on, it means that the laser level is at an angle difference of +0.75° to +1° as compared to levelness. For the convenience of description, the five LEDs are designated by #1 to #5 in Table 3 respectively, which correspond respectively to five LEDs 24a, 24b, 24c, 24d and 24e in the first indication module 24.

TABLE 3

| LED | #1 | #2 | #3 | #4 | #5 |
|---|---|---|---|---|---|
| Angle (degree) | +0.76° C. to +1° C. | +0.26° C. to +0.75° C. | +/− 0.5° C. | −0.26° C. to −0.75° C. | −0.76° C. to −1° C. |

Table 4 below shows that only when the angle difference is +/−0.5° with respect to the predetermined angle, will the middle LED be turned on. Position 221b in FIG. 5 is illustrated as the position in which the detected tilt angle is equal to the predetermined angle.

TABLE 4

| Angle | #3 |
|---|---|
| indication (First indication module) | +/− 0.5° C. |

Figure 6A:
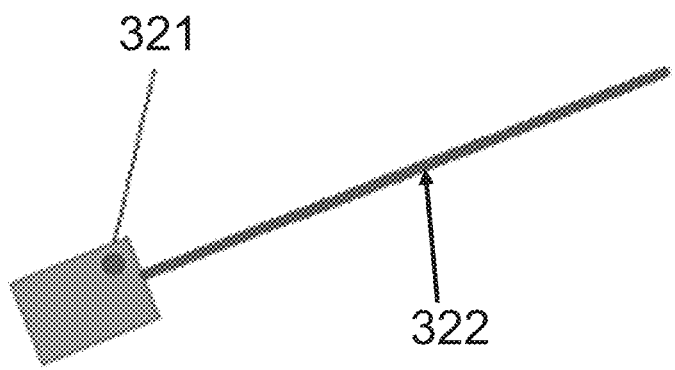
FIGS. 6a-6c are illustrations showing the method of extending a laser line measurement according to another embodiment of the invention.
Figure 6B:
Figure 6C:
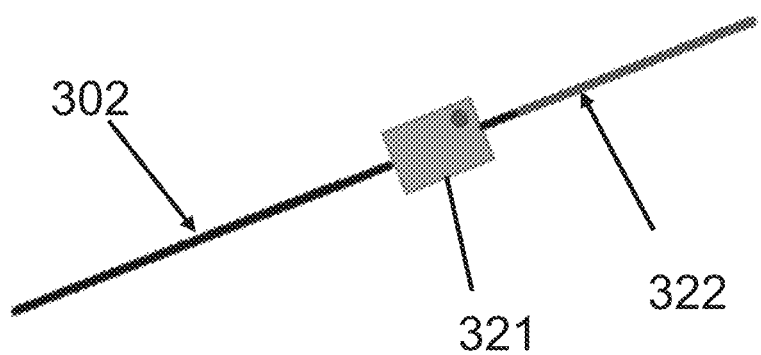

Now turning to FIGS. 6a-6c, an application of a laser level using the angle lock mode, according to an embodiment, will now be described. In FIG. 6a, a laser level 321 is firstly placed in front of a workpiece having a surface (not shown). Here, "in front" means that the laser level 321 approximates or contacts the surface, so that a laser line 322 emitted by the laser level 321 is substantially parallel to the surface. Then, the laser level 321 is moved or rotated by the user as necessary so that the laser level 321 is at a desired angle and is placed at a desired location on the surface. Then, along the laser line 322 the user marks (using a pen, a paint, carving, or any other physical means) a physical line 302 on the surface of the workpiece, as shown in FIG. 6b. The laser level 321 is then switched to an angle lock mode similar to the one described above, in which the desired angle is stored in memory of the laser level 321. The desired angle is also called the predetermined angle in this embodiment. The user then moves the laser level 321 to a place near the end of the physical line 302, and carefully adjusts the angle of the laser level 321 until it is at the predetermined angle, the determination of which is similar to the described operation in the angle lock mode above. Now as the laser line 322 has substantially the same angle as the physical line 302 on the surface, the laser line 322 appears as an extension of the physical line 302, and the measurement by the laser level 321 is now extended, as shown in FIG. 6c.

Figure 7A:
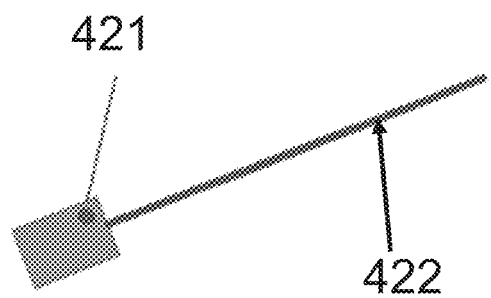
FIG. 7a-7c are illustrations showing the method of making a parallel line measurement by a laser level according to another embodiment of the invention.
Figure 7B:
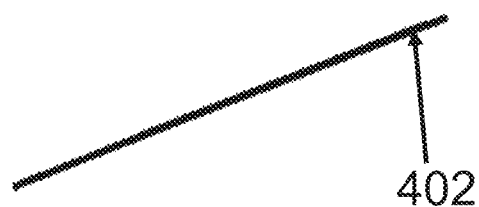
Figure 7C:
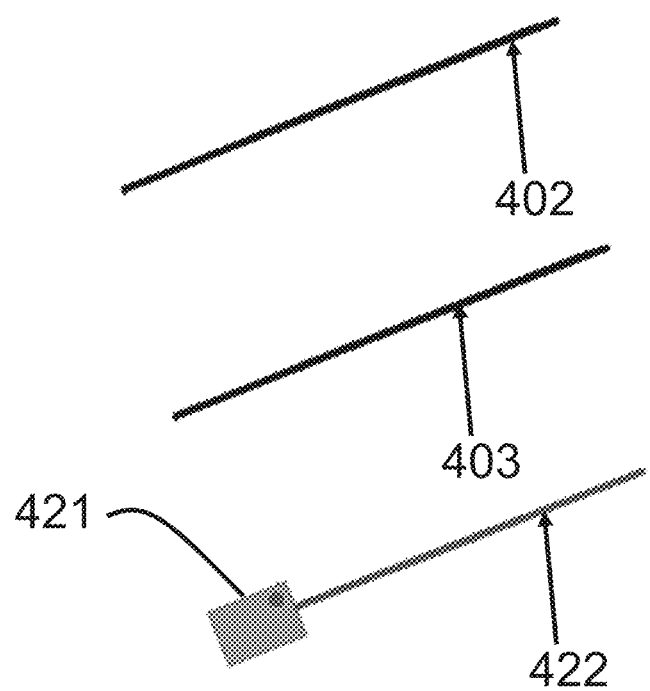

Now turning to FIGS. 7a-7c, another application of a laser level using the angle lock mode, according to an embodiment, will now be described. In FIG. 7a, a laser level 421 is firstly placed in front of a workpiece having a surface (not shown). Here, "in front" means that the laser level 421 approximates or contacts the surface, so that a laser line 222 emitted by the laser level 421 is substantially parallel to the surface. Then, the laser level 421 is moved or rotated by the user as necessary so that the laser level 421 is at a desired angle and is placed at a desired location on the surface. Then, along the laser line 422 the user marks (using a pen, a paint, carving, or any other physical means) a physical line 402 on the surface of the workpiece, as shown in FIG. 7b. The laser level 421 is then switched to an angle lock mode similar to the one described above, in which the desired angle is stored in memory of the laser level 421. The desired angle is also called the predetermined angle in this embodiment. The user then moves the laser level 421 along a direction offset from the length direction of the physical line 402 to a new location, and then rotates the laser level 421 so that it becomes at the predetermined angle. Then, the user can mark a new physical line along with the laser line 222 at a new location. FIG. 7c shows a new physical line 403 generated through the above procedures. FIG. 7c also shows that the laser level 421 is moved to a further away location and is ready to be referenced for marking a new physical line.

Figure 8:
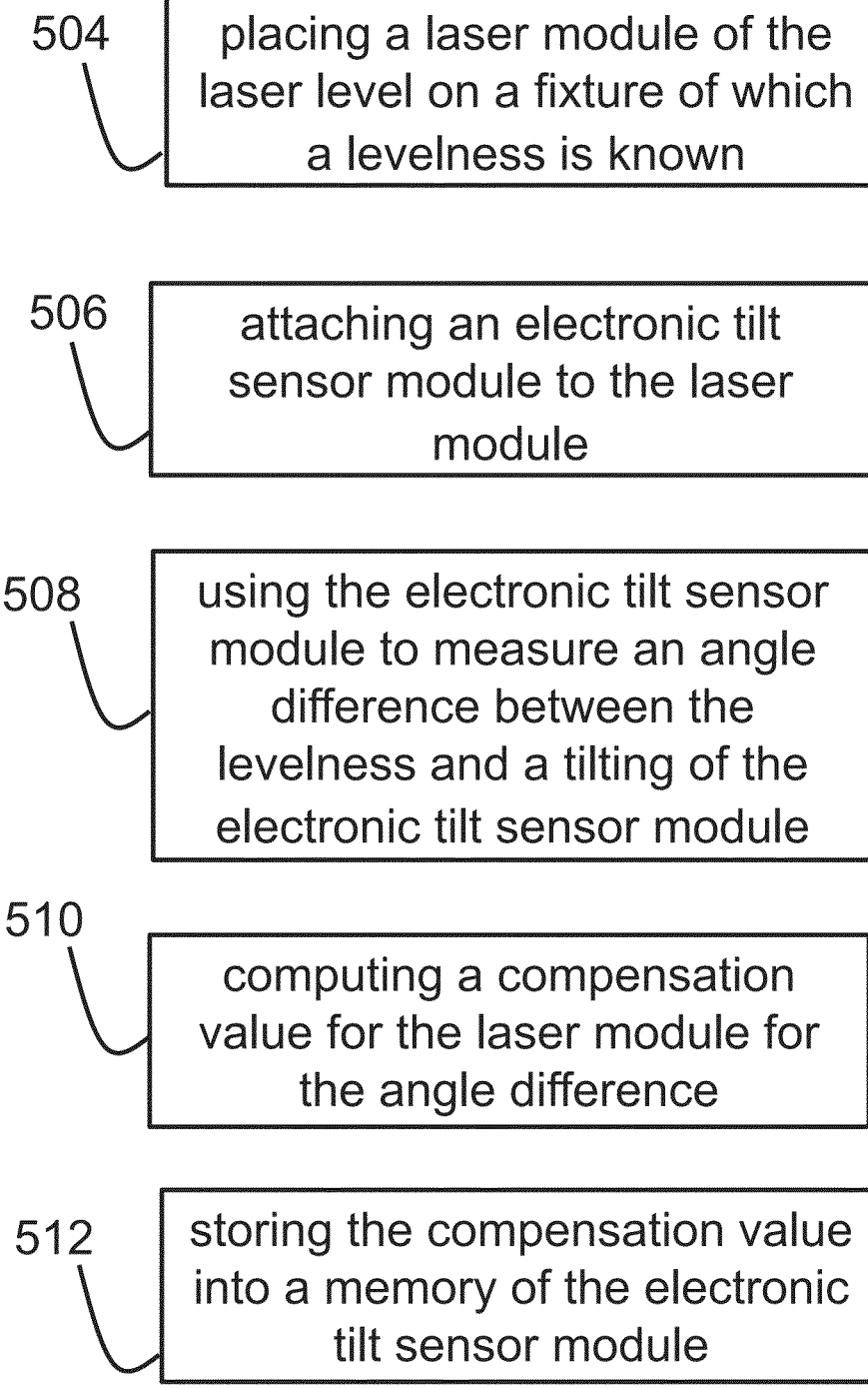
FIG. 8 is a flowchart showing procedures for calibrating a laser level according to another embodiment of the invention.

Turning now to FIG. 8, which shows a calibration method for a laser level in factory according to an embodiment of the present invention. Firstly, in Step 504 a laser module as a part of the laser level is placed on a fixture of which a levelness is known. The fixture for example can be a desktop or a wall which has exactly the 0° inclination or 90° inclination. The fixture is required in this way as only with a known tilt angle can the calibration of the electronic tilt sensor be made. Next, in Step 506, an electronic tilt sensor module is connected to the laser module. It should be noted that by saying an electronic tilt sensor module it includes a controller, a memory, and the electronic tilt sensor similar to those mentioned previously. Next, in Step 508, the electronic tilt sensor module is activated to measure an angle difference between the levelness (either horizontal or vertical) and a tilt of the electronic tilt sensor module. Such a difference exists because when the laser module is placed on the fixture, and when the electronic tilt sensor module is placed on the laser module, the two modules cannot be perfectly aligned with the surface of the fixture. Next, in Step 510 the angle difference is used to calculate a compensation value for the laser module, and in Step 512 the compensation value is stored in the memory of the electronic tilt sensor module so that it can be used in the future. With such calibration done, when the end user received the laser level, every time the laser level is powered up, then the controller will get the compensated value from the memory, measures the tilt angle read out from the electronic tilt sensor(s), and then calculates the actual tilt information based on the compensation value and displays the actual tilt information.

Figure 9:
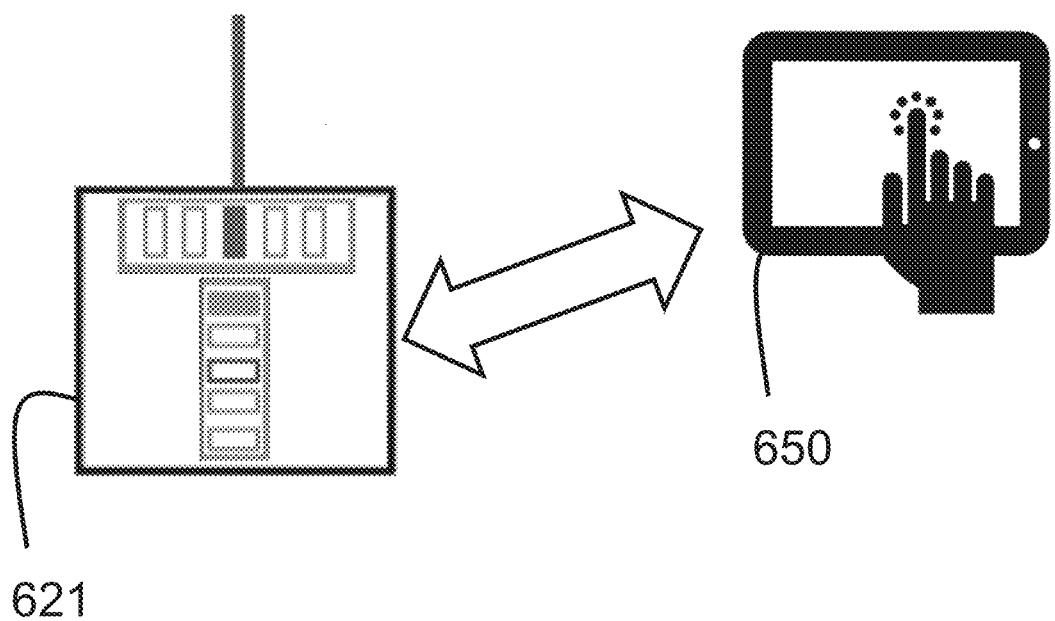
FIG. 9 shows a laser level system including a laser level and a portable computing device according to another embodiment of the invention.

Turning to FIG. 9, which shows a laser level 621 communicable wirelessly with an external device 650 according to another embodiment of the present invention. The external device 650 is a portable computing device which for example is a laptop computer, a tablet, a mobile phone, a Personal Digital Assistant (PDA), or other computing devices. The laser level 621 is equipped with a wireless transceiver (e.g. Bluetooth module, not shown)) which allows the laser level 621 to communicate with the external device 650 which also contains a compatible wireless transceiver. In cooperation with the external device 650, the laser level 621 can implement further functions. Firstly, the tilt data measured by the electronic tilt sensor in the laser level 621 could be transmitted to the external device 650 in digital format, so that the latter could precisely display the exact angle value on a screen of the external device 650, as compared to the relative "rough" display of the tilt condition by a laser level which only has a few LEDs. The above processes are performed by a dedicated software apps installed on the external device 650. Nonetheless, the laser level with LEDs is no doubt more convenient for use by the user than having to use an external device. The external device 650 can also send commands to the laser level 621 through the wireless interface. For example, the external device 650 can control the laser level 621 to switch between a normal working mode and an angle-lock mode. The external device 650 may also be used as an input device for inputting for example a predetermined angle value for the angle-lock mode.

Figure 10:
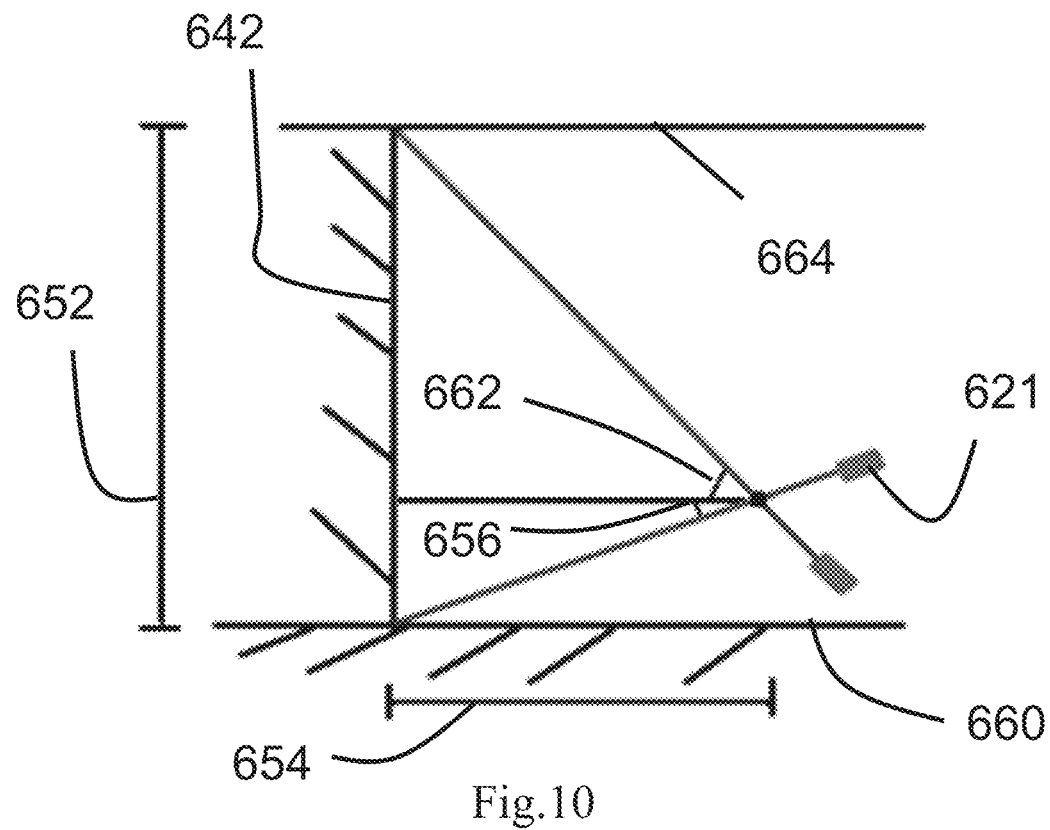
FIG. 10 shows how a laser level can be used to measure the height of a wall according to another embodiment of the present invention.

FIG. 10 shows an example of application that the external device 650 and the laser level 621 could be suited for. The external device 650 and the laser level 621 are used for calculating the height 652 of a wall 642 of an interior space. The method of calculation is explained as follows. Firstly, the user sets a reference point 658 (not shown) which is separated from the wall 642. There is no requirement on the position of the reference point 658 as the distance 654 between the reference point 658 and the wall 642 will be measured later. Then, the user measures, using the laser level 621, a first angle 656 though the reference point 658 to the lower corner at which the wall 642 intersects with a ground 660. The value of the first angle 656 is transmitted by the laser level 621 to the external device 650 and is saved in the external device 650 and the laser level 621. Preferably, the screen of the external device 650 also displays in real-time the value of the first angle 656. Next, the user measures, using the laser level 621, a second angle 662 though the reference point 658 to the upper corner at which the wall 642 intersects with a ceiling 664. The value of the first angle 662 is transmitted by the laser level 621 to the external device 650 and is saved in the external device 650 and the laser level 621. Preferably, the screen of the external device 650 also displays in real-time the value of the second angle 662. Subsequently, the user measures the distance 654 for example by using a laser distance measuring device (not shown), or by a ruler. In the final step, the user then calculate the height 652 of the wall 642 using the equation:

Height of the wall=(tan(first angle)+tan(second angle))*distance from the reference point to the wall  [1]

The calculation using Eq. [1] can be done by the user, or can be done automatically by the software apps installed in the external device 650. The exact value of the height 652 is then displayed to the user on the screen of the external device 650.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, in the laser level shown in FIGS. 1-3, there are two electronic tilt sensor and two indication modules respectively. However, the number of the electronic tilt sensor and that of the indication module is not limited. Rather, according to application requirements, there can be more or less electronic tilt sensors, and/or indication module, on a single laser level.

Similarly, although the above embodiment shows five LEDs in an indication module, more or less LEDs can be configured in an indication module without departing from the essence of this invention. More LEDs for example may increase the resolution of the tilt angle that the laser level may display.

The above embodiment shows five LED in a row (i.e. along a straight line). However, in other variants of the invention the LEDs may also be aligned along different directions, such as along a curve, or along a bent line. Any geometrical alignment of the plurality of LEDs is possible if there is a need. Lastly, the above embodiment described various display patterns of LEDs in an indication module, for example the running pattern or a "floating" pattern (which corresponds to the normal working mode as described for FIG. 3). However, such implementations should not be viewed as limits to the present invention, as other dynamic effects exhibited by indication module can also be adopted to indicate the tilt angle.

The display modules configured on the laser level as described above are Indication module with multiple LEDs aligned in a row. However, those skilled in the art should realize that other types of display device could also be used for the laser level, for example LCD device.

In addition, although in the embodiments described above the user is informed of the tilt angle (at least roughly) by the illumination pattern displayed by the LEDs. However, in other variations of the invention different types of user notification can be utilized, such as audible alert.

What is claimed is:

1. A laser level comprising
   a) a housing,
   b) an electronic tilt sensor located in the housing;
   c) a controller to which the electronic tilt sensor is connected; the controller communicable with a first display device and a second display device; and
   d) a laser module which is adapted to project a straight ground laser line on a flat surface;
      wherein the electronic tilt sensor is adapted to detect a tilt of the laser level, and provide a measurement signal to the controller; the controller adapted to provide a display signal to the first and second display devices to display information about the tilt.

2. The laser level according to claim 1, wherein the first and second display devices are mounted on the housing and connected to the controller wirely.

3. The laser level according to claim 2, the first and second display devices are configured to display levelness of a tilt angle for the ground laser line with respect to a vertical axis, in two planes respectively.

4. The laser level according to claim 3, wherein the vertical axis is perpendicular to the earth; the two planes being perpendicular to each other, as well as being both perpendicular to the earth.

5. The laser level according to claim 1, wherein the first and second display devices each further comprises a plurality of lighting elements; the plurality of lighting elements adapted to provide a varying light pattern to indicate information about the tilt angle.

6. The laser level according to claim 5, wherein the plurality of lighting elements is aligned in a row and comprises a middle lighting element and two side lighting elements.

7. The laser level according to claim 6, wherein the middle lighting element is configured to be activated when the laser level is at substantially at a predetermined tilt angle; one said side lighting elements configured to be activated when the laser level is deviated from the predetermined tilt angle.

8. The laser level according to claim 7; wherein the predetermined tilt angles are 0°, 180° or 90° with respect to a vertical axis.

9. The laser level according to claim 1, further comprises a user switch which is adapted to power on/off of the laser level, and a mode switch which is adapted to switch between a normal measuring mode and an angle-lock mode.

10. The laser level according to claim 1, wherein the first display device is adapted to indicate a low battery status of the laser level.

11. The laser level according to claim 6, wherein the laser level is adapted to work in an angle-lock mode in which the controller saves the tilt information into a memory which is connected to the controller.

12. The laser level according to claim 11, wherein when the laser level is substantially at a saved tilt angle, only the middle lighting element is configured to be turned on; when the laser level is deviated from the saved tilt angle, only a side lighting element configured to be turned on.

13. The laser level according to claim 1, further comprises a wireless module connected to the controller; the first and second display devices being implemented on a screen of a portable computing device.

14. The laser level according to claim 13, wherein the wireless module is adapted to transfer the information of the tilt to the portable computing device wirelessly connected with the laser level.

15. A method of calibrating a laser level, comprising:
    a) placing a laser module of the laser level on a fixture of which a levelness is known;
    b) attaching an electronic tilt sensor module to the laser module;
    c) using the electronic tilt sensor module to measure an angle difference between the levelness and a tilt of the electronic tilt sensor module;
    d) computing a compensation value for the laser module for the angle difference; and
    e) storing the compensation value into a memory of the electronic tilt sensor module.

16. A method of extending a line measurement by a laser level, comprising:
    a) placing the laser level in front of a workpiece having a surface;
    b) pointing the laser level at a predetermined angle; the laser level emitting a laser line along the predetermined angle; marking a physical line on the surface which substantially follows the laser line;
    c) saving the predetermined angle into a memory of laser level;
    d) moving the laser level to an end of the physical line; and
    e) adjusting the laser level to be at the predetermined angle, so that the line measurement is extended.

17. The method of claim 16, wherein the predetermined angle is inputted to the laser level through a portable device external to the laser level.

18. A method of making a parallel line measurement by a laser level, comprising:
    a) placing the laser level in front of a workpiece having a surface;
    b) pointing the laser level at a predetermined angle; the laser level emitting a laser line along the predetermined angle;
    c) marking a physical line on the surface which substantially follows the laser line;
    d) saving the predetermined angle into a memory of laser level;
    e) moving the laser level in an offset direction from the physical line; and
    f) adjusting the laser level to be at the predetermined angle, so that the laser line becomes parallel to the physical line.

19. The method of claim 18, wherein the predetermined angle is inputted to the laser level through a portable device external to the laser level.

20. A method of measure the height of a target, comprising the steps:
    a) measuring the horizontal distance between the target and a reference point;
    b) using a laser level to measure a first angle through the reference point to the lower corner at which the target intersects with a ground;
    c) transmitting a value of the first angle by the laser level to an external device;
    d) saving the value of the first angle in the external device and the laser level;

e) using the laser level measure a second angle though the reference point to the upper corner at which the target intersects with a ceiling;
f) transmitting a value of the second angle by the laser level to the external device;
g) saving the value of the second angle in the external device and the laser level; and
h) calculating the height of target using the following equation:

Height of target=(tan(first angle)+tan(second angle))
\*distance from the reference point to the target.

\* \* \* \* \*